(12) United States Patent
Ebermann et al.

(10) Patent No.: US 6,678,637 B2
(45) Date of Patent: Jan. 13, 2004

(54) METHOD FOR EVENT-RELATED DETERMINATION OF PROCESS VARIABLES

(75) Inventors: Joachim Ebermann, Amtsberg (DE); Harald Eichelkamp, Muehlau (DE)

(73) Assignee: Siemens Aktiengesellschaft (DE)

( * ) Notice: Subject to any disclaimer, the term of this patent is extended or adjusted under 35 U.S.C. 154(b) by 110 days.

(21) Appl. No.: 09/928,957

(22) Filed: Aug. 13, 2001

(65) Prior Publication Data

US 2002/0077773 A1 Jun. 20, 2002

(30) Foreign Application Priority Data

| Jul. 20, 2000 | (DE) | ............ 101 35 426 |
| Aug. 16, 2000 | (DE) | ............ 100 40 083 |
| Aug. 16, 2000 | (DE) | ............ 100 40 089 |

(51) Int. Cl.[7] ............................................ G06F 11/08
(52) U.S. Cl. .................................... 702/184; 700/9
(58) Field of Search ............................ 702/184, 81, 82, 702/83, 84, 179, 176–178, 182, 183, 187, 188; 700/9, 12, 14, 19, 52, 67

(56) References Cited

U.S. PATENT DOCUMENTS

| 3,725,653 A | * | 4/1973 | Carr et al. ..................... 700/29 |
| 4,027,145 A | * | 5/1977 | McDonald et al. ......... 700/287 |
| 4,311,446 A | * | 1/1982 | Hold et al. .................. 425/144 |
| 5,486,995 A | * | 1/1996 | Krist et al. .................... 700/29 |
| 6,038,540 A | * | 3/2000 | Krist et al. ..................... 705/8 |
| 6,056,781 A | * | 5/2000 | Wassick et al. ............... 703/12 |
| 6,246,972 B1 | * | 6/2001 | Klimasauskas ................ 703/2 |
| 6,343,741 B1 | * | 2/2002 | Arends et al. ......... 235/462.25 |

* cited by examiner

Primary Examiner—Marc S. Hoff
Assistant Examiner—Edward Raymond
(74) Attorney, Agent, or Firm—Baker Botts LLP

(57) ABSTRACT

Process variables (s1, s2) are detected and processed cyclically in a controller (BG). Process variables (s_(x)) from the adjacent cyclically determined process variables (s_(n−1), s_(n)) are determined as being event-related as a function of the time (t_(x)) of the event within the cycle. The calculation also includes derivatives of the process variable (s).

5 Claims, 2 Drawing Sheets

METHOD FOR EVENT-RELATED DETERMINATION OF PROCESS VARIABLES

FIELD OF THE INVENTION

The present invention relates to a method for event-related determination of process variables in control assemblies, in particular microcomputer-aided control assemblies, in which process variable profiles are detected by cyclic sampling, and processed in a control program. Such methods are generally well-known and used in control assemblies for machines of all types.

BACKGROUND OF THE INVENTION

Microcomputer-aided control assemblies in which process variables such as distance, pressure, temperature etc are processed are used for controlling machines, handling devices and system parts. In general, assemblies such as these operate cyclically, in a timed mode. In this case, it is necessary to record the process variables as they exist at the sampling time, for which purpose the assemblies have parts which contain memories in which the instantaneous values of the process variables are stored at the sampling time either directly by the clock or in the context of an interrupt service routine. The control program then refers to the instantaneous values for open and closed-loop control purposes in the time period between two samples.

For certain control tasks, it is necessary to detect instantaneous values of process variables at the time of a process event, for example the position value of a machine shaft at the switching time of a measurement probe. Parts containing additional memory are provided for this purpose, in which the instantaneous values of the process variables are stored with respect to a signal which indicates the process event. These parts containing additional memory are required for each process variable and each process event.

Control engineering concepts in which the components of a system are arranged in a decentralized manner and are coupled to one another hierarchically via a bus system are being used increasingly. In this case, the process variables are detected using different components, which are synchronized by suitable mechanisms beyond the bus. However, such mechanisms are not suitable for transmitting the switching signal of a process event precisely at the event time through the bus to the components which require the switching signal. The switching signal therefore has to be passed to these components via an additional connecting line.

It is also possible for a switching signal which indicates the process event to be supplied to a central memory, which stores the actual time of the process event, with, this time being related absolutely or relatively to the sampling times (of which the control program is aware) and with the control program using the instantaneous values of the process variables of the samples on either side of the time of the process event to calculate the magnitude of the process variable corresponding to the time of said process event. However, this solution has the disadvantage that the calculated value has an error from the actual value from the actual profile of the process variable between the sampling times, at the time of the process event. The magnitude of this discrepancy differs, depending on the time interval between the samples and the relationship with the process variable dynamics. The object of the present invention is to provide the calculated value of the process variable with high accuracy.

SUMMARY OF THE INVENTION

According to the present invention, this object is achieved by a method in which the time $t\_(x)$ of a process event is related absolutely or relatively to the preceding or subsequent cyclic sampling time $t\_(n-1)$ or $t\_(n)$ and the control program determines the instantaneous value, which corresponds to the time $t\_(x)$ of the process event, of a process variable $p\_(x)$. This determination is made by a calculation from the instantaneous values $p\_(n-1)$ or $p\_(n)$ of the process variable from the samples on either side of the process event, and in that the variable state of the first and second derivations of the process variable p are taken into account when determining the process variable $p\_(x)$ for the time $t\_(x)$ of the process event. The application for the present invention as originally filed in German is incorporated herein by reference.

A preferred embodiment of the present invention is obtained by taking account of the third derivative of the process variable p when determining the variable state. The method can be carried out easily in that the process variable $p\_(x)$ for the time $t\_(x)$ of the process event is determined with reference to the value of the variable state p which results from the closest sample $t\_(n-1)$ or $t\_(n)$ to the time $t\_(x)$ of the process event.

However, as an alternative, it is also possible in the method as initially disclosed for the time $t\_(x)$ of a process event to be related absolutely or relatively to the preceding or subsequent cyclic sampling time $t\_(n-1)$ or $t\_(n)$, and wherein the control program determines the instantaneous value, which corresponds to the time of the process event, of a process variable $p\_(x)$ by calculation via a ratio assessment. This calculation takes into account the relative position of the time of the process event $t\_(x)$, from the instantaneous values $p(n-1)$ or $p\_(n)$ of the process variable at the time of the samples on either side of the process event. There is therefore no need either for any parts containing additional memories in the control assemblies or for any additional connecting lines for the switching signal relating to the process event between components arranged in a decentralized manner. Furthermore, since the process variable p is detected in components which are coupled by means of a bus system, decentralized multi-component operation is feasible.

DRAWINGS

Exemplary embodiments of the present invention are disclosed in greater detail in the following text, and are illustrated in the drawings, in which.

DETAILED DESCRIPTION OF THE INVENTION

Figure 1:
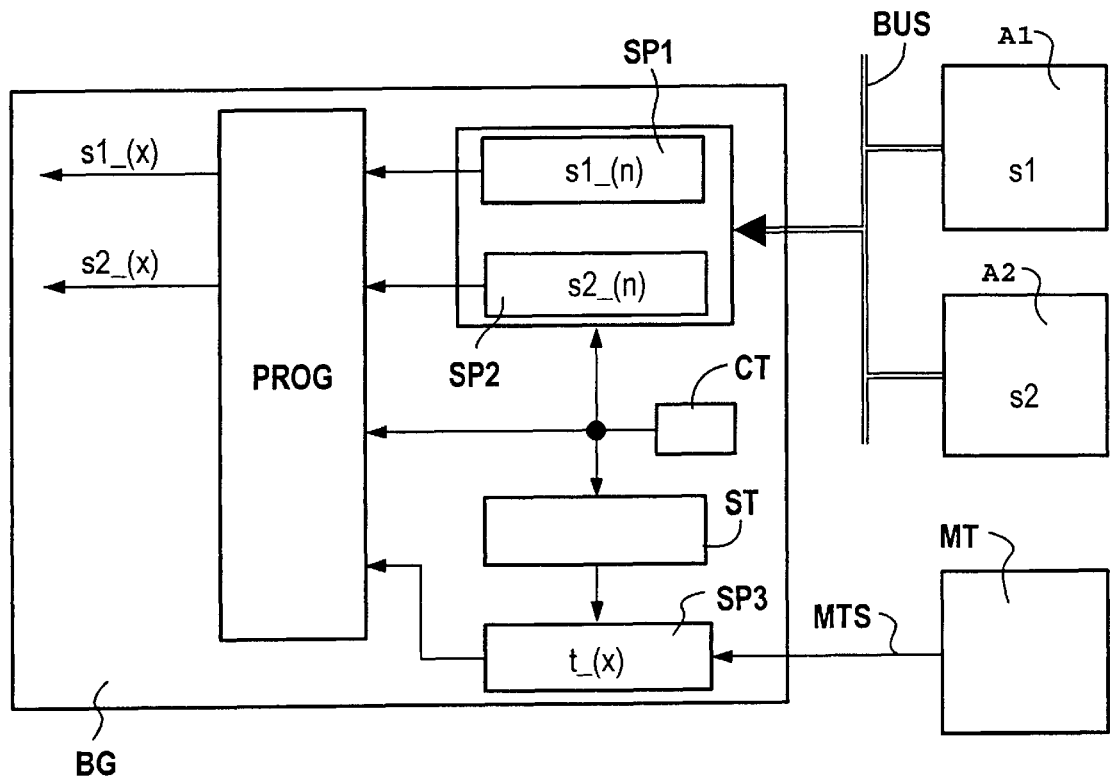
FIG. 1 shows a block diagram of a positioning assembly for controlling machine shafts.

FIG. 1 shows a block diagram of a positioning assembly BG for controlling machine shafts which is coupled via a bus to a number of drives A1, A2, etc. All the drives A1, A2, etc. are synchronized via a global control message as slaves to the cycle clock CT of the positioning assembly BG which is the master. The position values S1, S2, . . . of the shafts in the drives A1, A2, . . . are detected at the time of this clock pulse, and are then transmitted sequentially via the bus to the positioning assembly BG, where they are stored in memories SP1, SP2 as timed position values s1_(n), s2_(n) for a control program PROG. The control program PROG thus operates with position values s1_(n), s2_(n) which correspond exactly to the values of the process variable s at the respective sampling time t_(n). The position values s_(n) are stored in the control assembly as s_(n−1), s_(n−2), to a depth covering a number of samples.

The control program PROG calculates the variable state velocity v_(n) from the respective position values s_(n) and s_(n−1) for each machine shaft in the sampling cycle, and uses v_(n) and v_(n−1) to calculate the variable state acceleration a_(n). The variable state v_(n) in this case applies to the relative time precisely in the center between two samples $t\_(_m)=0.5*(t\_(_n)-t\_(_{n-1}))$. The variable state a_(n) applies in a corresponding manner to the time t_(n−1).

An object of the positioning assembly BG is to detect the contact point of a measurement probe MT with a tool or a workpiece when said measurement probe MT is deflected. To this end, a measurement probe signal MTS is passed as a transfer call to a memory SP3 in the positioning assembly BG. Memory SP3 stores the instantaneous value of a timer ST which is started with the initial value 0 with each clock cycle of a central clock transmitter CT in the positioning assembly BG. At the time when the measurement probe MT switches, the time t_(x) is transferred from the timer ST to the memory SP3. In the following clock cycle t_(n), the process event is identified and, in the clock cycle t_(n+1), the position values s_(x) which are associated with the switching time t_(x) of the measurement probe MT are determined from the available variables for the samples (n−1) to (n+1) for one or more shafts, using the following relationship:

```
if ( t_(x) > t_(m) )
  {// reverse calculation from cycle t_(n)
  delta_t = t_(n+1) − t_(n) − t_(x);
  s_(x) = s_(n) − ( 0.5 * ( v_(n) + v_(n+1) ) −
  a_(n+1) * delta_t ) * delta_t}
else
  {// forward calculation from cycle t_(n−1)
  delta_t = t_(x);
  s_(x) = s_(n−1) + ( 0.5 * ( v_(n−1) + v_(n) ) +
  a_(n) * delta_t ) * delta_t}
```

In the same way, other process variables can be determined on an event-related basis in other applications, for example pressure or temperature values, which are processed in a user program in a PLC (programmable logic controller). One advantage of the present invention is that it is also applicable to arrangements which are not decentralized in that standard assemblies can be used which have no memories for event-dependent storage of instantaneous values of a process variable.

Figure 2:
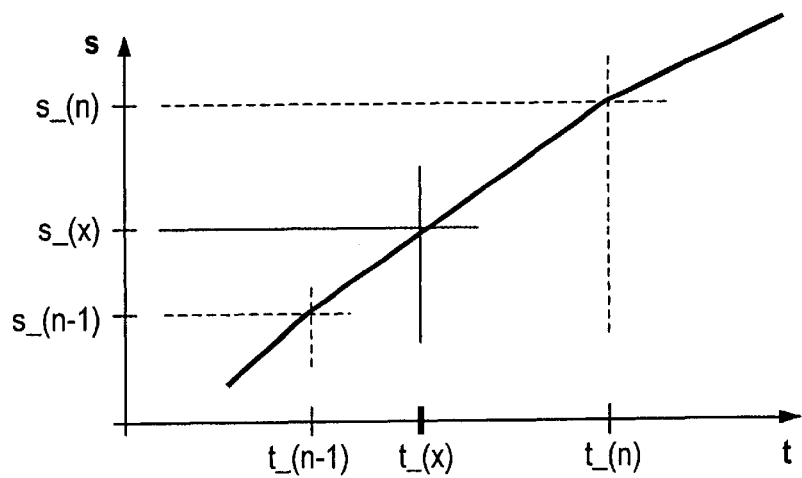
FIG. 2 shows a distance/time diagram.
Figure 3:
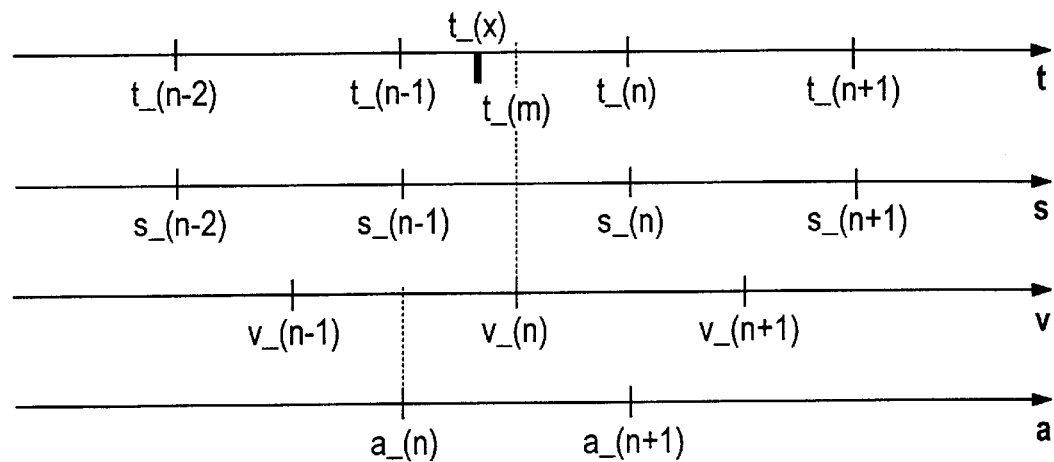
FIG. 3 shows a correlation map.
Figure 4:
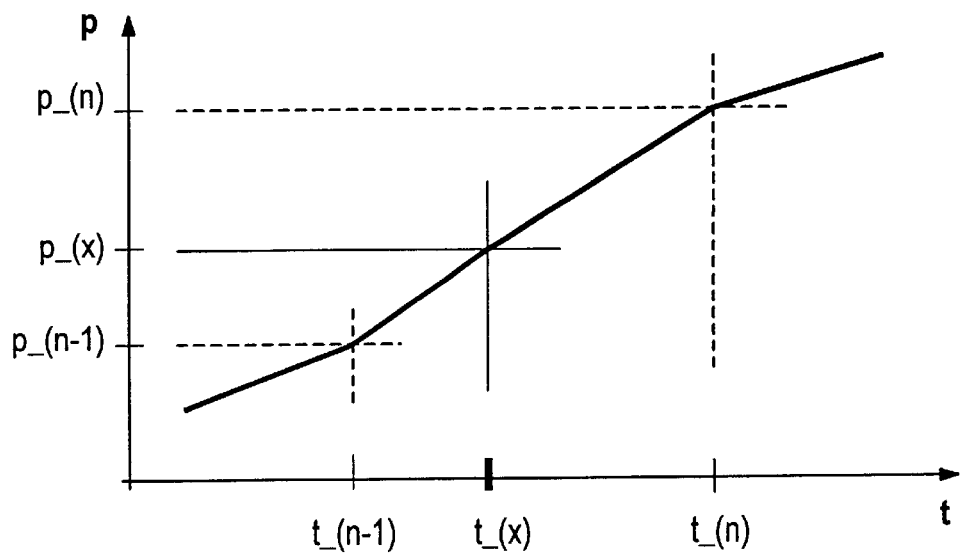
FIG. 4 shows a process variable profile.

FIG. 2 shows the profile of any given position value s which may, for example, correspond to the position value s1, plotted against the time t, to be precise including the timed and calculated variables. FIG. 3 correlates the time t, position values s, velocity v and acceleration a. FIG. 4 shows the profile of a process variable p which may, for example, correspond to a position value s, plotted against time t including the timed and calculated variables. The graphi cally visualized determination option for the value of the process variable and the time t_(x) is in this case assumed to be a simple linear interpolation, namely:

$$(t\_(x)-t\_(n-1))/(t\_(n)-t\_(n-1)) \text{ corresponding to } (p\_(x)-p\_(n-1))/(p\_(n)-p\_(n-1)).$$

The value of the process variable p_(x) is thus calculated as:

$$p\_(x)=p\_(n-1)+(P\_(n)-p\_(n-1))*(t\_(x)-t(n-1))/(t\_(n)-t\_(n-1)).$$

In a control assembly in which a number of process variables are processed, such as the position values s1, s2 and s3 in a three-dimensional coordinate system, the use of this calculation method makes it possible to determine the three-dimensional coordinates (s1_(x); s2_(x); s3_(x)), in which case a common time (t_(x) of the process event is used as a reference for all three process variables.

In this way, the method is generally applicable to any desired number of process variables, and to physically different process variables.

We claim:

1. A method for event-related determination of process variables in control assemblies comprising detecting process variable profiles by cyclic sampling, and processing said variable profiles in a control program, wherein a process event time is related to a cyclic sampling time, and wherein the control program determines and instantaneous value which corresponds to the time of the process event of a process variable by calculation from the instantaneous value of the process variable from samples on either side of the process event, and wherein variable states of a first and second derivative of the process variable are taken into account when determining the process variable for the time of the process event and further comprising the relationship wherein

```
if ( t_(x) > t_(m) )
  {// reverse calculation from cycle t_(n)
  delta_t = t_(n+1) − t_(n) − t_(x);
  s_(x) = s_(n) − ( 0.5 * ( v_(n) + v_(n+1) ) −
  a_(n+1) * delta_t ) * delta_t}
else
  {// forward calculation from cycle t_(n−1)
  delta_t = t_(x);
  s_(x) = s_(n−1) + ( 0.5 * ( v_(n−1) + v_(n) ) +
  a_(n) * delta_t ) * delta_t}.
```

2. The method according to claim 1, wherein the third derivative of the process variable is taken into account when determining the variable state.

3. The method according to claim 1, wherein the process variable for the time of the process event is determined with reference to the value of the variable state which results from the closest sample to the time of the process event.

4. A method for event-related determination of process variables in control assemblies comprising detecting process variable profiles by cyclic sampling, and processing said variable profiles in a control program, wherein a process event time is related to a cyclic sampling time, and wherein the control program determines an instantaneous value, which corresponds to the time of the process event, of a process variable by calculation via a ratio assessment, which takes account of the relative position of the time of the process event, from the instantaneous values of the process variable at the time of the samples on either side of the process event, and further comprising the relationship wherein

```
if ( t_(x) > t_(m) )
{// reverse calculation from cycle t_(n)
delta_t = t_(n+1) − t_(n) − t_(x);
s_(x) = s_(n) − ( 0.5 * ( v_(n) + v_(n+1) ) −
a_(n+1) * delta_t ) * delta_t}
else
    {// forward calculation from cycle t_(n−1)
```

-continued

```
delta_t = t_(x);
s_(x) = s_(n−1) + ( 0.5 * ( v_(n−1) + v_(n) ) +
a_(n) * delta_t ) * delta_t}.
```

5. The method according to claim 1, wherein the process variable is detected using components which are coupled by means of a bus system.

\* \* \* \* \*